Dec. 8, 1959  A. DE GENOVA  2,915,927
TOOL FOR REMOVING SPRING NUTS
Filed July 11, 1956

INVENTOR.
ANDREW DE GENOVA

BY

ATTORNEYS though on the drawings:

United States Patent Office 2,915,927
Patented Dec. 8, 1959

2,915,927

TOOL FOR REMOVING SPRING NUTS

Andrew De Genova, Chicago, Ill.

Application July 11, 1956, Serial No. 597,204

1 Claim. (Cl. 81—3)

This invention relates to the removal of spring nuts of the type arranged to be slipped on the end of a pin or the like and having one or more teeth resiliently urged into biting engagement with the pin to prevent removal of the nut. Such nuts are used, for example, in the installation of decorative chrome strips on the bodies of automobiles, the nuts being slipped on the inner end of a pin connected to the chrome strip and extending inwardly through an opening in the sheet metal body of the automobile.

Some nuts are inexpensively made, readily installed and hold securely even with severe shocks and vibrations. However, it is very difficult to remove the nuts with tools of the prior art and practically impossible to do so without damage to the nut or the chrome strip, the automobile body, or members which are held together. The problem is further complicated by the fact that the nuts are oftentimes not in a readily accessible location. After making many frustrating attempts to remove the nuts with screwdrivers, chisels, pliers and the like, most automobile body repair mechanics resign themselves to effecting the removal by drilling out the pin.

This invention was evolved with the object of providing a tool for removing spring nuts without damage to the parts held together by the nuts.

According to this invention, a tool is provided which not only permits ready removal of the nut without damage to the parts held together by the nuts but also permits reuse of the nuts. The tool is very simple in operation and construction and is economically manufacturable. It requires very little force to operate and can be operated with one hand of the user so as to be particularly valuable when the nuts are in a location which is not readily accessible.

This invention contemplates other objects, features and advantages which will become more fully apparent from the following detailed description taken in conjunction with the accompanying drawing which illustrates a preferred embodiment and in which.

As shown on the drawings.

Figure 1:
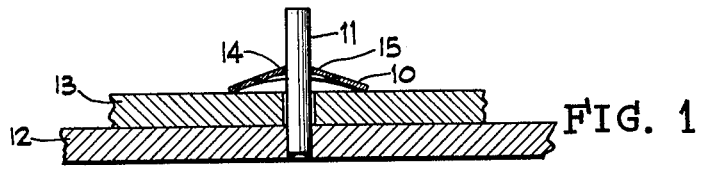
Figure 1 is a sectional view illustrating parts held together by a spring nut of the type removable by the tool of this invention.
Figure 2:
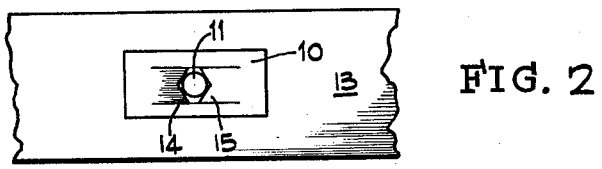
Figure 2 is a plan view of the nut of Figure 1.

Reference numeral 10 designates a nut of a type which may be removed by the tool of this invention. The nut 10 is slipped on a pin 11 connected to a part 12 and extending through an opening in a part 13. The part 12 may be a decorative chrome strip and the part 13 may be the sheet metal body of an automobile.

The illustrated nut 10 is in the form of a bowed strip of resilient sheet metal such as steel and has a pair of slits parallel to its side edges to provide a section which is centrally severed to define a pair of teeth 14 and 15 on opposite sides of the pin 11. The nut is preferably so formed that in its unstressed condition the teeth 14 and 15 are separated by a distance less than the thickness of the pin so that when the nut 10 is pressed on the pin, the teeth 14 and 15 will be urged by their inherent resiliency into biting engagement with the pin. The teeth are usually formed with V-shaped notches as illustrated to obtain a centering action and better biting engagement. When the nut 10 is installed, the ends of the same engage the part 13 and the teeth are pressed toward the part 13, so that the entire nut is deformed to resiliently urge the teeth into biting engagement with the pin and to resiliently hold the parts together.

It will be appreciated that the nut 10 cannot be removed with ordinary tools. The use of screwdrivers, pliers and the like will only result in urging the teeth 14 and 15 into tighter engagement with the pin 11.

Figure 3:
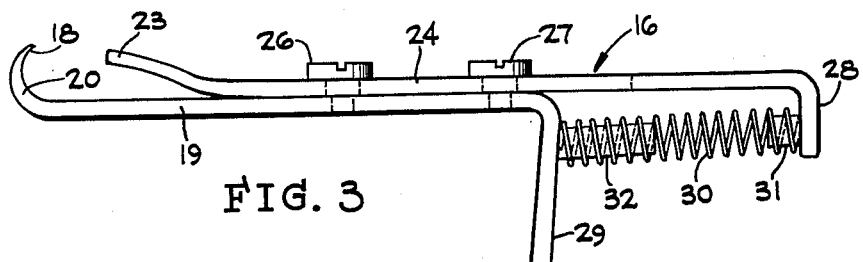
Figure 3 is a side view of a tool constructed in accordance with the principles of this invention.
Figure 4:
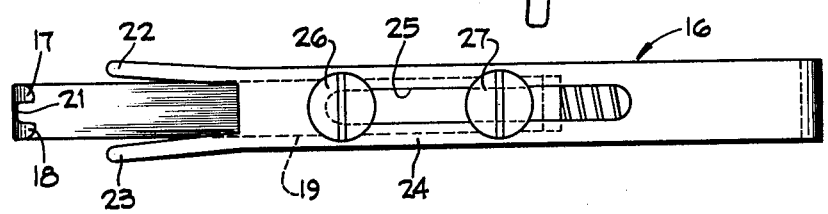
Figure 4 is a front view of the tool of Figure 3.
Figure 5:
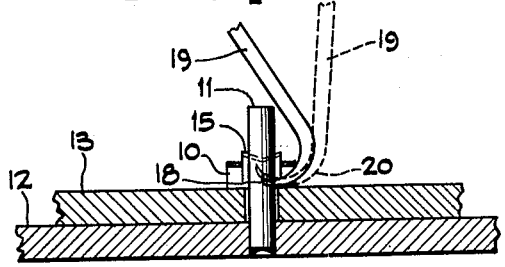
Figure 5 is a sectional view illustrating how the tool is used to remove a nut.

Referring now to Figures 3 and 4, reference numeral 16 generally designates a tool constructed in accordance with the principles of this invention. The tool 16 comprises a pair of prongs or fingers 17 and 18 arranged for engagement with the teeth 14 and 15 for moving the same out of biting engagement with the pin 11. The fingers 17 and 18 are formed integrally on the end of a lever 19 which has a curved portion 20 adjacent the fingers 17 and 18. As illustrated in Figure 5, the lever 19 is held in a position such that the tip thereof, at the fingers 17 and 18, engages a part such as the part 12 being held by the nut, and the lever is then slid on the part until the fingers 17 and 18 underlie the teeth of the nut. To so position the fingers 17 and 18, a stop surface 21 is provided between the fingers 17 and 18, the surface 21 being engageable with the pin and being spaced from the tips of the fingers 17 and 18 a distance such as to properly locate the fingers relative to the teeth of the nut. This distance will usually be approximately the same as the diameter of the pin.

After the lever 19 is positioned as illustrated in Figure 5 in full lines, it is pivoted to a position such as illustrated in dotted lines in Figure 5 to engage the fingers 17 and 18 with the teeth of the spring nut. In this pivoting action, the outer surface of the curved portion 20 will roll on the surface of the part 13.

After the fingers 17 and 18 are engaged with the teeth of the nut, the lever 19 is rotated or pivoted to a further extent to move the teeth out of biting engagement with the pin. If the pin is short, this may be sufficient for removal of the nut. However, if the pin is longer, this action will not be effective to remove the nut. It is then necessary to make use of a seocnd pair of fingers 22 and 23 which are arranged to engage the nut 10 at points adjacent the ends thereof, separate from the teeth 14 and 15. With the fingers 22 and 23 acting to limit movement of the end of the nut in a direction toward the end of a pin, and with the fingers 17 and 18 acting to move the teeth 14 and 15 toward the end of the pin, it is possible to move the teeth 14 and 15 out of biting engagement with the pin and thus permit removal of the nut.

The fingers 22 and 23 are formed integrally on the end of a bar 24 which has a longitudinal slot 25 through which a pair of headed screws 26 and 27 extend, the screws 26 and 27 being threaded into the lever 19. The bar 24 and the lever 19 are thus connected together for relative movement of the fingers 17, 18 and 22, 23 toward and away from each other.

The tool 16 may be operated with the use of only one hand of the user. In particular, the thumb of the user may be engaged with a lateral projection 28 on the end of the bar 24, and the first finger (or both of the first and second fingers) may be engaged with an arm 29 projecting laterally from the end of the lever 19. Accordingly, when the thumb and fingers are moved together, the fingers 17, 18 and 22, 23 of the tool will be moved together. A coiled compression spring 30 is disposed between the projection 28 and the arm 29, the end of the spring being arranged on guide pins 31 and 32 respectively projecting from the portion 28 and the arm 29. The spring 30 insures that the fingers 17, 18 and 22, 23 will be moved together only when a certain actuating pressure is applied.

It will thus be appreciated that this invention provides a tool which permits ready removal of a spring nut without damage to the parts held by the nut and without damage to the nut. The tool is very simple in operation and construction and economically manufacturable. It requires very little force to operate and can be operated with one hand so as to be particularly valuable when the nuts are in relatively inaccessible locations. It will be appreciated that the tool can be used with spring nuts which are somewhat different in construction from that illustrated. The tool can also be used to apply nuts.

It will be understood that modifications and variations may be effected without departing from the spirit and scope of the novel concepts of this invention.

I claim as my invention:

In a tool for removing a spring nut in the form of a bowed strip of resilient sheet metal having ends engaged with a part and having a pair of slits parallel to its side edges to provide a section which is centrally severed to define a pair of teeth in biting engagement with opposite sides of a pin to lock the pin and part together, a lever, a pair of aligned hook-shaped fingers on the end of said lever, said fingers being spaced apart a certain distance for engagement with the teeth of the nut, a second pair of fingers spaced apart a distance substantially greater than said certain distance and slidably supported on said lever for movement longitudinally thereof to an operative position in which said first pair of fingers is disposed intermediate said second pair of fingers, said second pair of fingers being then engageable with the nut adjacent the opposite ends thereof.

References Cited in the file of this patent

UNITED STATES PATENTS

| | | |
|---|---|---|
| 664,494 | Olsen | Dec. 25, 1900 |
| 2,700,910 | Van Niel | Feb. 1, 1955 |
| 2,715,350 | Bedford | Aug. 16, 1955 |